US005152423A

United States Patent [19]

Tseng

[11] Patent Number: 5,152,423

[45] Date of Patent: Oct. 6, 1992

[54] ELASTIC CLIP GUN

[76] Inventor: Liang-Chuan Tseng, No. 36, Lane 134, Tong-An Road, Tainan, Taiwan

[21] Appl. No.: 801,006

[22] Filed: Dec. 2, 1991

[51] Int. Cl.[5] .......... B65G 59/00

[52] U.S. Cl. .......... 221/279; 294/99.1; 29/243.56

[58] Field of Search .......... 221/279, 280; 294/99.1, 294/99.2, 165, 148; 29/243.56

[56] References Cited

U.S. PATENT DOCUMENTS 1,439,458 12/1927 West .......... 294/99.1

4,173,427 11/1979 Beuch et al. .......... 294/99.1

*Primary Examiner*—Robert P. Olszewski

*Assistant Examiner*—Kenneth Noland

[57] ABSTRACT

An elastic clip gun comprising an upper body and an lower body combined together, having a central lengthwise passageway for an elastic clip made of a bent plate to move forward therein, the elastic clip having a central opening to fit with a central lengthwise guide rail and to slide thereon and then to be pushed by a pushing block fitted and moved manually in a sliding opening in the upper surface to push the clip out of a pinching opening provided with two Y-shaped plates to expand the clip so as to pinch papers placed in the pinching opening.

1 Claim, 5 Drawing Sheets

ELASTIC CLIP GUN

BACKGROUND OF THE INVENTION

A conventional elastic clip gun shown in FIGS. 1-3 comprises two half bodies 10, 11 combined and adhered together by means of high frequency processing. The half bodies 10 respectively have a Y-shaped groove 100, 110 in the front portions and two Y-shaped elastic plates 12, 13 are respectively placed in the grooves 100, 110. The two pins 14, 15 are inserted through pin holes 101, 111 in the bottom of the Y-shaped grooves 100, 110 and through holes 120, 130 in the elastic plates 12, 13 so as to keep the plates 12, 13 in the grooves 100, 110. After than a pushing block 16 is inserted in a sliding opening 17 through a notch 170 at the end of the sliding opening 17 and a cap 18 is put on the notch 170, preventing the pushing block 16 from falling off the sliding opening 17. Then a tail cap 19 is provided to cover on a rectangular opening 106 for placing therein an elastic clip C. In addition, sliding grooves 102, 112, are provided in the inner walls of the half bodies 10, 11 for the lip CO of the elastic clip C to slide therein, and guide rails 103, 113 having the same width as the height C1 of the elastic clip C are provided parallel to the sliding grooves 102, 112 so that the elastic clip C can slide in a passageway 105, 115 guided by the guide rails 103, 113 without turning upside down.

The conventional elastic lip gun can use only elastic clips of one size, limited by the distance between the two guide rails 103, 113. In addition, its assemblage needs comparatively long time and much work owing to the complicated structure.

SUMMARY OF THE INVENTION

The elastic clip gun in the present invention has been planned to have the following features.

1. Its assemblage is fast and convenient, and its cost is low.

2. It can use elastic clips of various sizes, needless to prepare various molds for making clip guns of different sizes.

In order to use elastic clips of various sizes, the passageway for an elastic clip to move along is provided with a guide rail in the middle of the passageway bottom surface to guide the clip with different width to slide along from the rear portion to the front end to pinch papers.

DETAILED DESCRIPTION OF THE INVENTION

Figure 1:
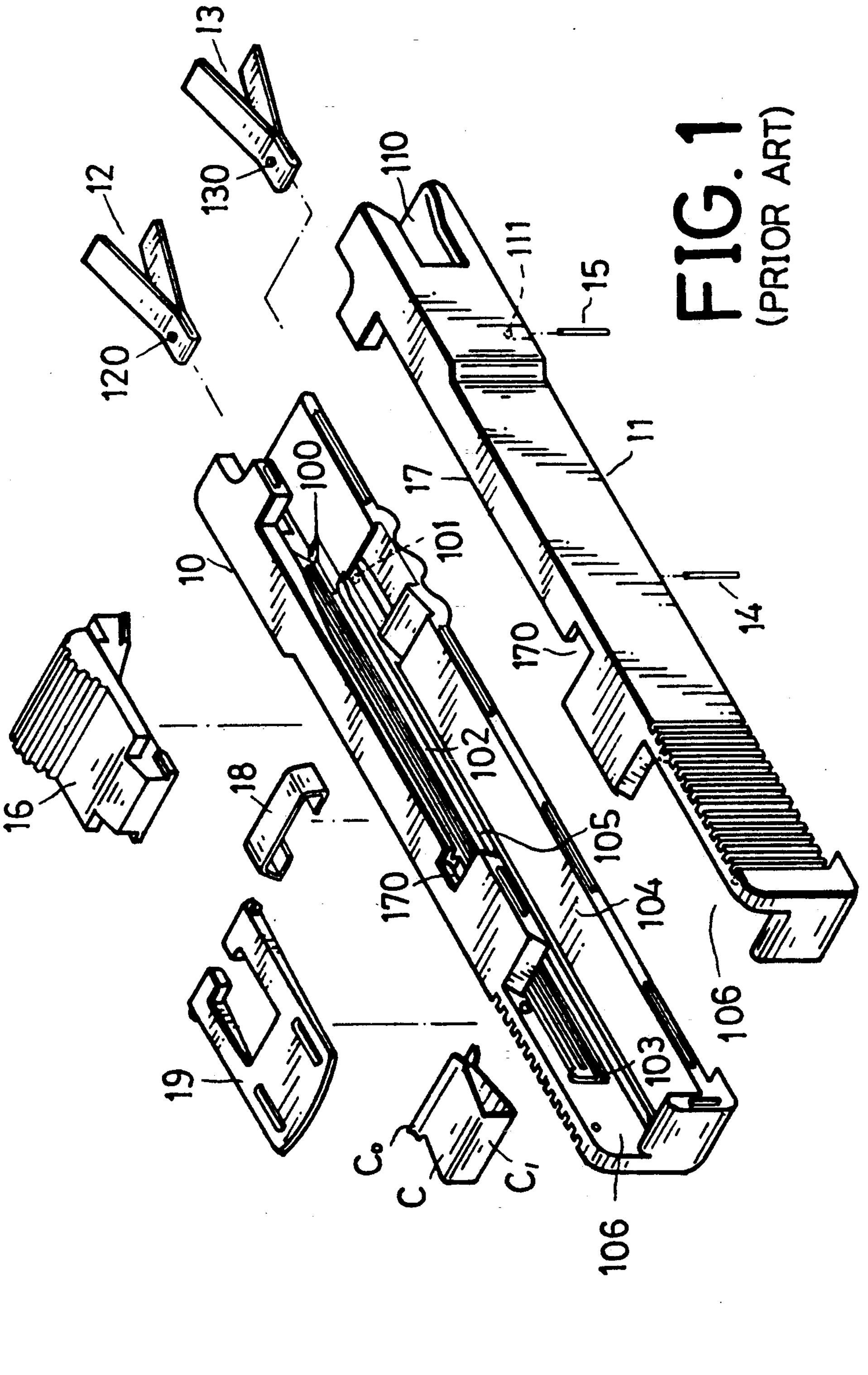
FIG. 1 (PRIOR ART)
FIG. 1 is an exploded perspective view of a conventional elastic clip gun.
Figure 2:
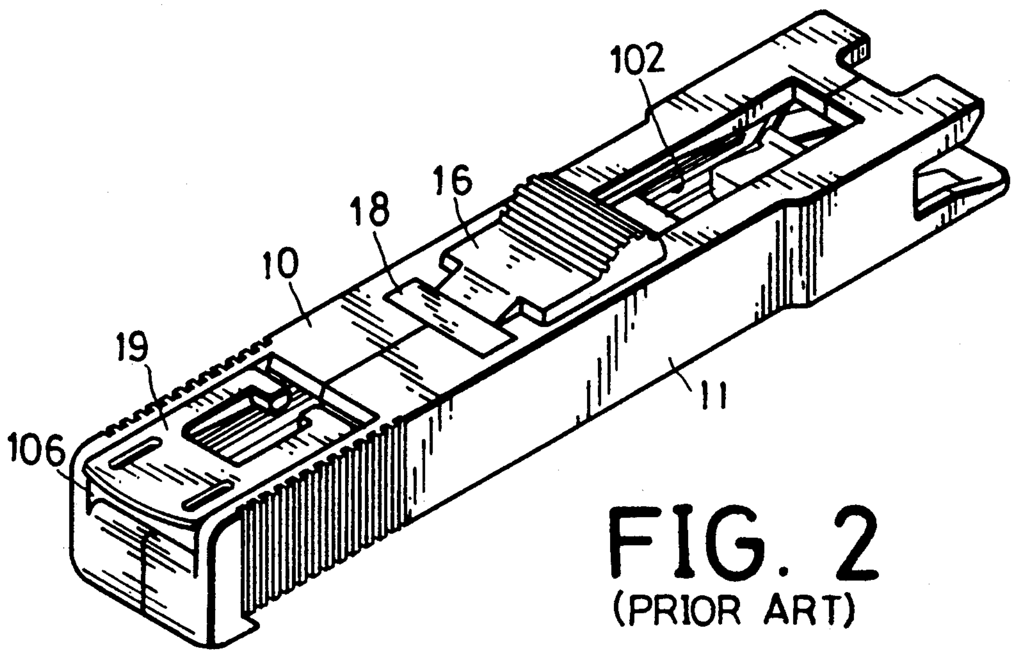
FIG. 2 (PRIOR ART)
FIG. 2 is a perspective view of a conventional elastic clip gun.
Figure 3:
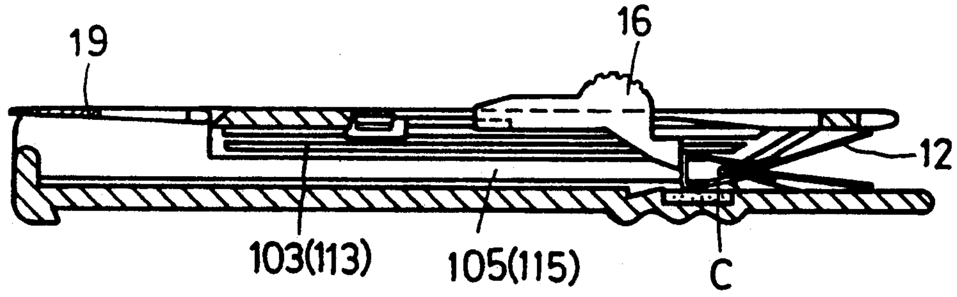
FIG. 3 (PRIOR ART)
FIG. 3 is an side cross-section view of a conventional elastic clip gun.
Figure 4:
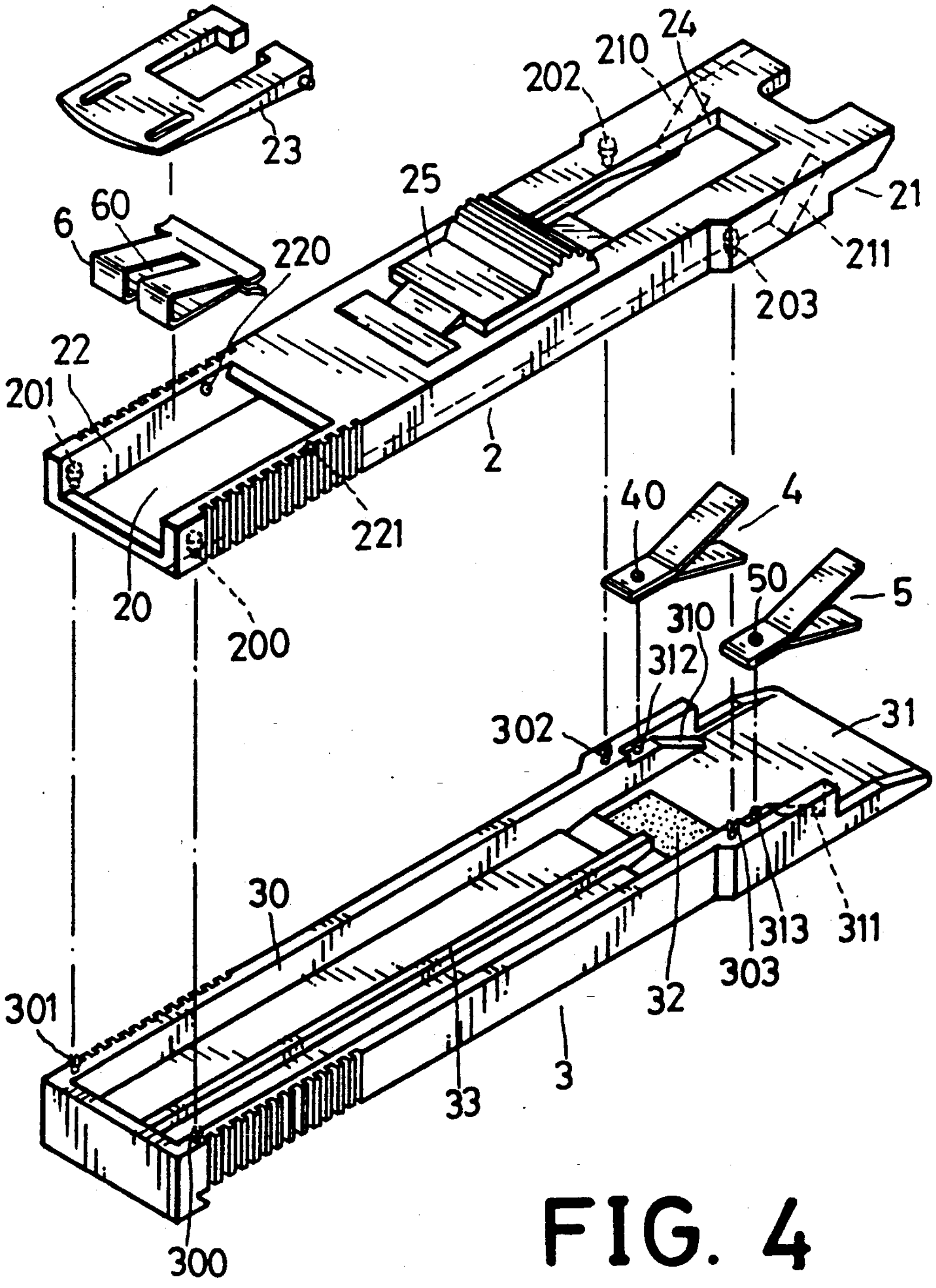
FIG. 4 is an exploded perspective view of a conventional elastic clip gun in the present invention.
Figure 5:
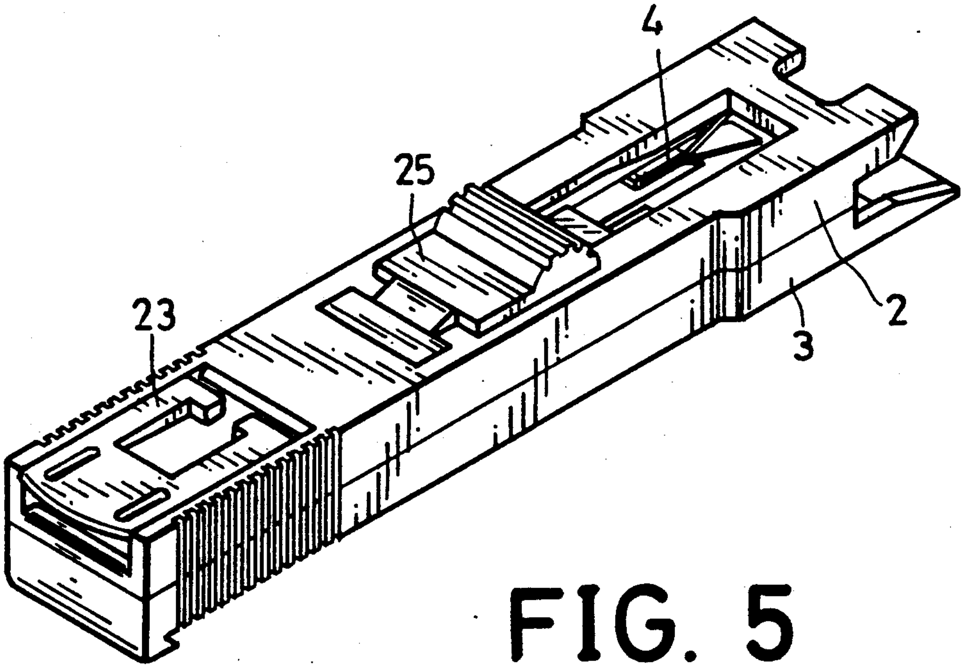
FIG. 5 is a perspective view of a conventional elastic clip gun in the present invention.
Figure 6:
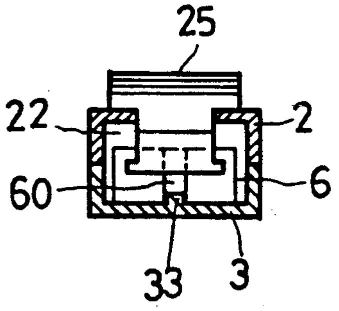
FIG. 6 is a cross-sectional view of D—D' line in FIG. 5.
Figure 7:
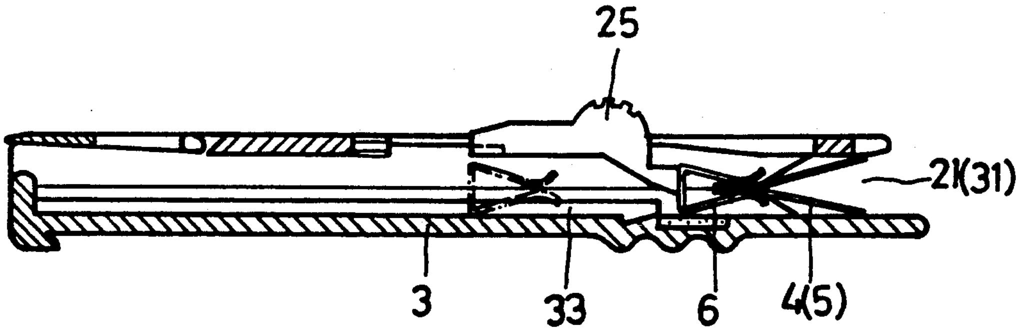
FIG. 7 is a cross-sectional view of E—E' line in FIG. 5.

The elastic clip gun in the present invention, as shown in FIGS. 4, 5, comprises an upper body 2 and a lower body 3 combined together. Both bodies 2, 3 respectively have a passageway 20, 30, and a pinching opening 21, 31 at the front end. The upper body 2 has a clip entrance 22 in the rear portion communicating with the passageway 20, two vertical fitting grooves 220, 221 on the outside of the entrance 22, a cap 23 covering on the entrance 22, a sliding rectangular opening 24 in the upper surface for a pushing block 25 to fit and move therein, two upward slopes 210, 211 at both side walls of the pinching opening 21. The lower body 3 has two downward slopes 310, 311 at both side walls of the pinching opening 31, two pins 312, 313 on the top of the slopes 310, 312, several elastic pins 300, 301, 302, 303 on both side walls, a position magnet plate 32 on the inner bottom surface near the opening 31, a guide rail 33 extending lengthwise on the inner bottom surface, and two Y-shaped elastic plates 4, 5 on the pinching openings 31, 21. The elastic plates 4, 5 respectively have a round holes 40, 50 for two pins 312, 313 to fit in. An elastic clip 6 is to be placed through the entrance 22 in the passageway 20, 30 in the two bodies 2, 3, having a lengthwise central straight opening 60 in the rear portion to fit with and slide on the guide rail 33 in the lower body 3.

In assembling this elastic clip gun, at first two elastic Y-shaped plates 4, 5 are to be placed on the downward slopes 310, 311 in the lower body 3, and then fit the round holes 40, 50 in the plates 4, 5 with the pins 312, 313. Next, the upper body 2 is to be held to cover on the lower body 3, fitting the pin holes 200, 201, 202, 203 with the elastic pins 300, 301, 302, 303 so as to assemble both bodies together as shown in FIG. 5.

In using this elastic clip gun, the cap 23 is to be swung open and an elastic clip 6 is to be placed through the entrance 22, letting the central opening 60 to fit with the guide rail 33 so that the clip 6 can slide forward along the rail 33 to reach the magnet plate 32 by declining the clip gun forward. The magnet plate 32 can pull and stop the clip 6 thereon. Then the pushing block 25 becomes in contact with the rear end of the clip 6, and pushing manually the block 25 forward can move the clip 6 to pass over the Y-shaped plates 4, 5, which then expand the lip of the clip 6. Then the opened front edges of the lip of the clip can fall on the edges of papers placed in the pinching opening 21, 31, pinching the papers.

What is claimed is:

1. An elastic clip gun comprising;

an upper body having (1) a central lengthwise passageway for an elastic clip to move therein, (2) a pinching opening at the front end, (3) a clip entrance in the rear portion, (4) vertical fitting grooves respectively on the opposite outer wall surfaces of said clip entrance, (5) a cap covered on said clip entrance, (6) a long sliding opening in the upper front surface for a pushing block to fit and move back and forth therein, (7) a pushing block for shoving an elastic clip to move out of said pinching opening so as to pinch papers but therein, (8) a pair of upward slopes in both side walls near said pinching opening and (9) a plurality of pin holes in the bottom of two side walls for pins in a lower body to fit therein so as to combine said upper body with the lower body;

a lower body to be combined with the upper body, having (1) a central lengthwise passageway for an elastic clip to move therein, (2) a pinching opening at the front end, (3) a pair of downward slopes in both side walls near said pinching opening, (4) a pin extending upright from said downward slopes, (5) a magnet plate on the inner bottom surface near said slopes, (6) several elastic pins at the points corresponding to the pin holes in said upper body, (7) a guide rail provided lengthwise on the middle of the bottom surface to guide an elastic clip to move forward to said pinching opening:

two Y-shaped elastic plates having a pin hole to fit with said pin on said downward slopes so as to position the elastic plates on said downward slopes; and said central lengthwise passageway being formed in said upper and lower body combined together, for an elastic clip out through said clip entrance to move sliding forward on said guide rail and to be shoved by said pushing block manually and to be pushed through said Y-shaped elastic plates, said elastic clip made of a bent plate having a central lengthwise straight opening at the rear portion to fit with said guide rail so as to slide along thereon, said Y-shaped plates able to insert through the lip of the elastic clip and expand said clip to pinch papers in the pinching opening when said elastic clip is shoved by said pushing block manually operated.

* * * * *